(No Model.) 5 Sheets—Sheet 1.
O. TYBERG.
BUTTON MAKING MACHINE.
No. 574,857. Patented Jan. 5, 1897.
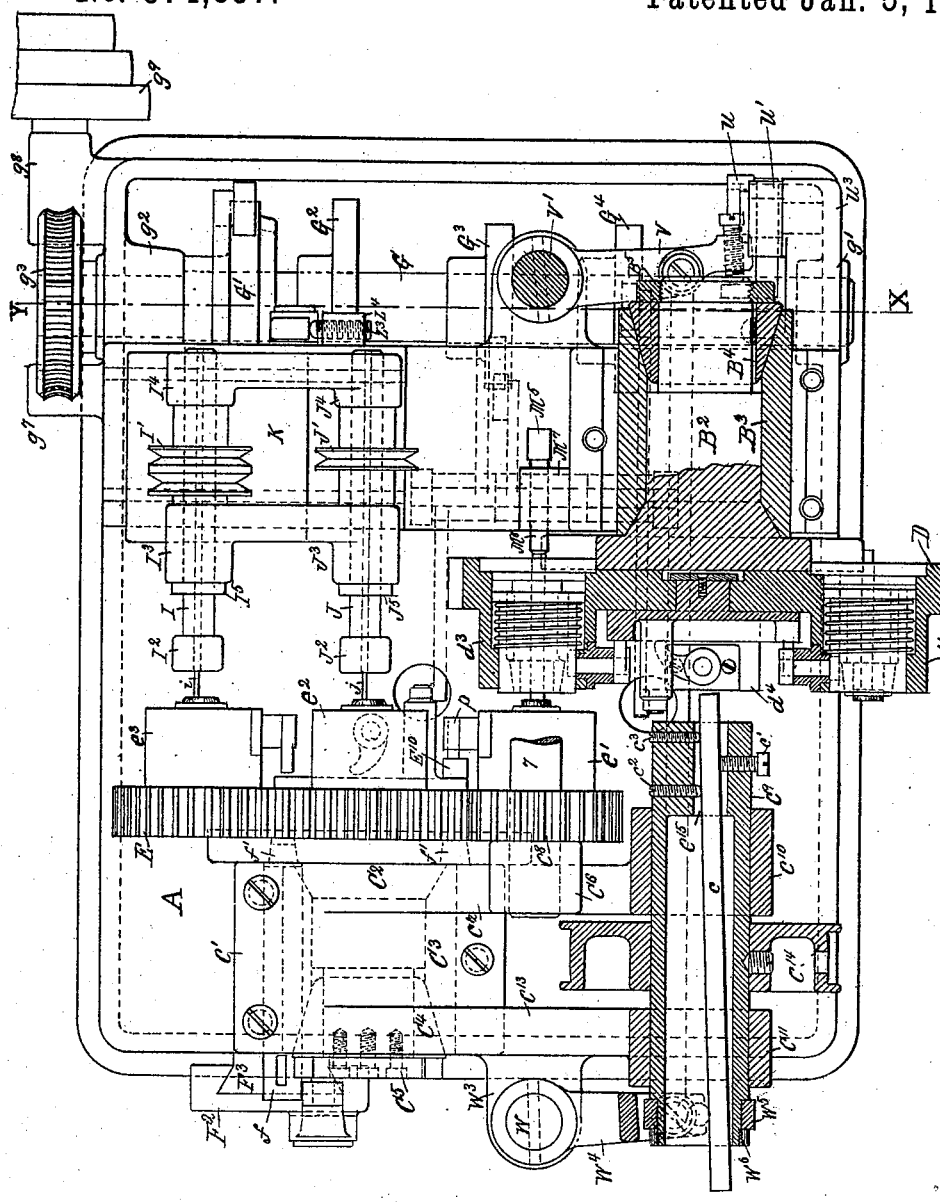
Fig. I.
WITNESSES:
Alfred Shedlock
Catharine Georgi
INVENTOR
O. Tyberg (No Model.) 5 Sheets—Sheet 2.
O. TYBERG.
BUTTON MAKING MACHINE.
No. 574,857. Patented Jan. 5, 1897.
Fig II.
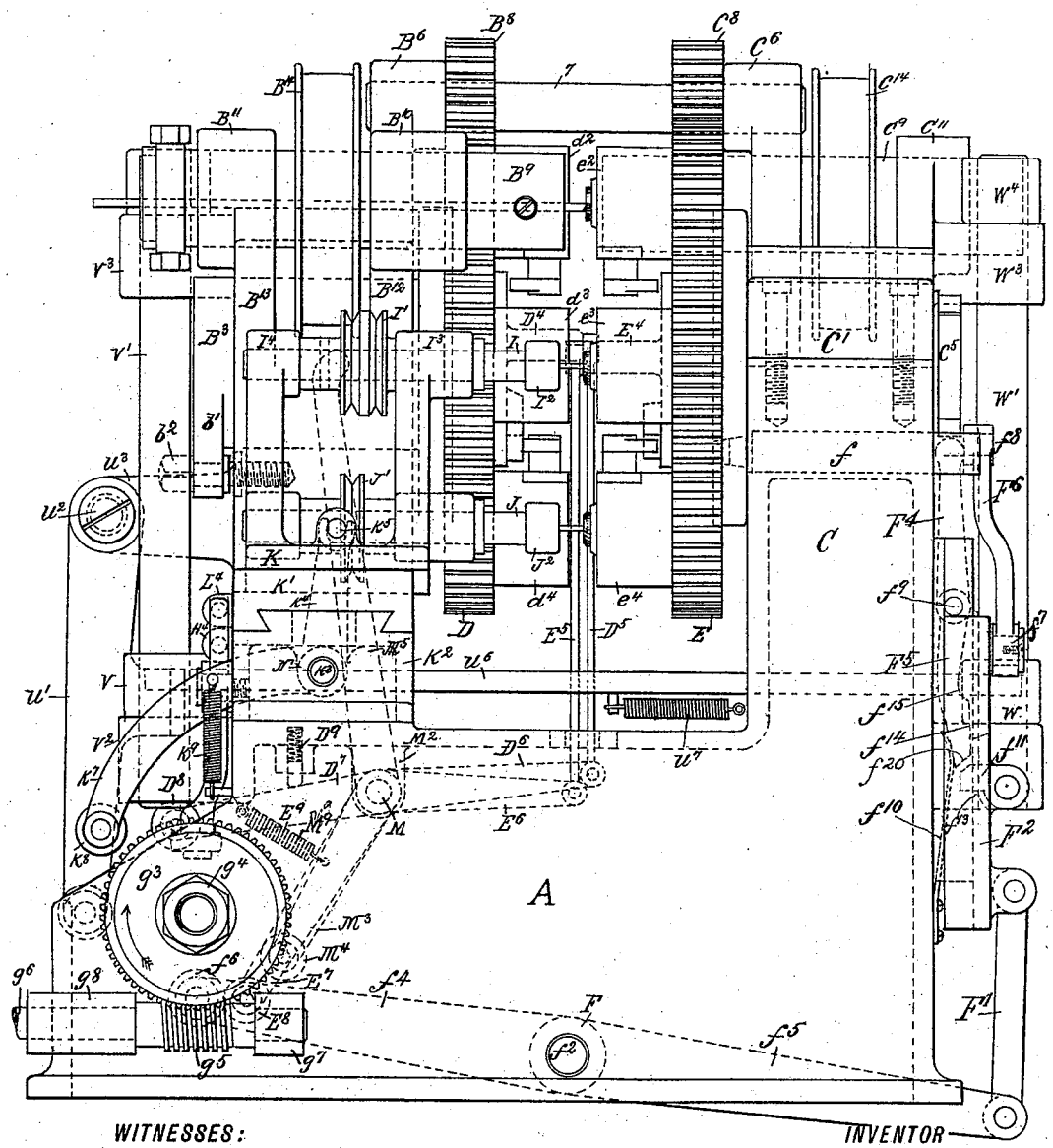
WITNESSES: INVENTOR

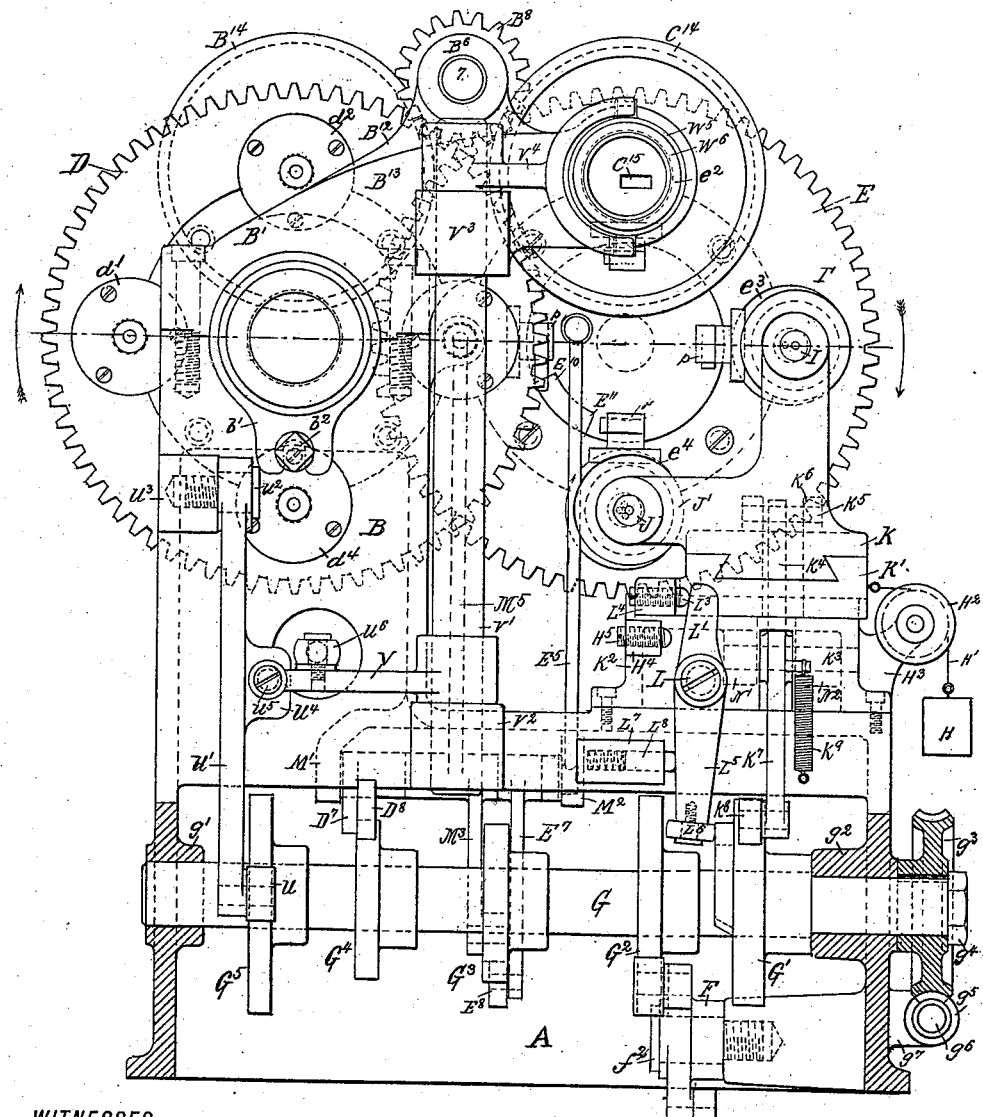

(No Model.) 5 Sheets—Sheet 4.
O. TYBERG.
BUTTON MAKING MACHINE.
No. 574,857. Patented Jan. 5, 1897.
*Fig. IV.*
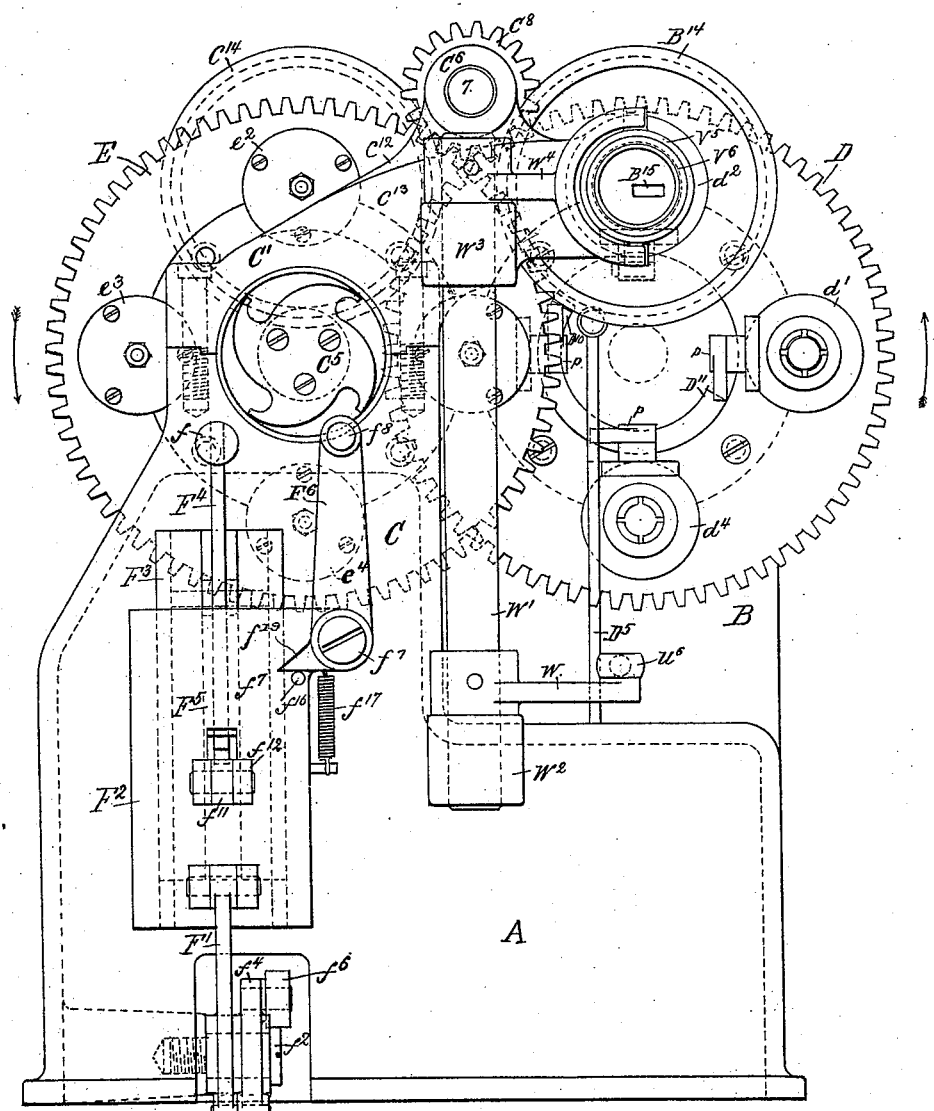
WITNESSES:
INVENTOR (No Model.) 5 Sheets—Sheet 5.
O. TYBERG.
BUTTON MAKING MACHINE.
No. 574,857. Patented Jan. 5, 1897.
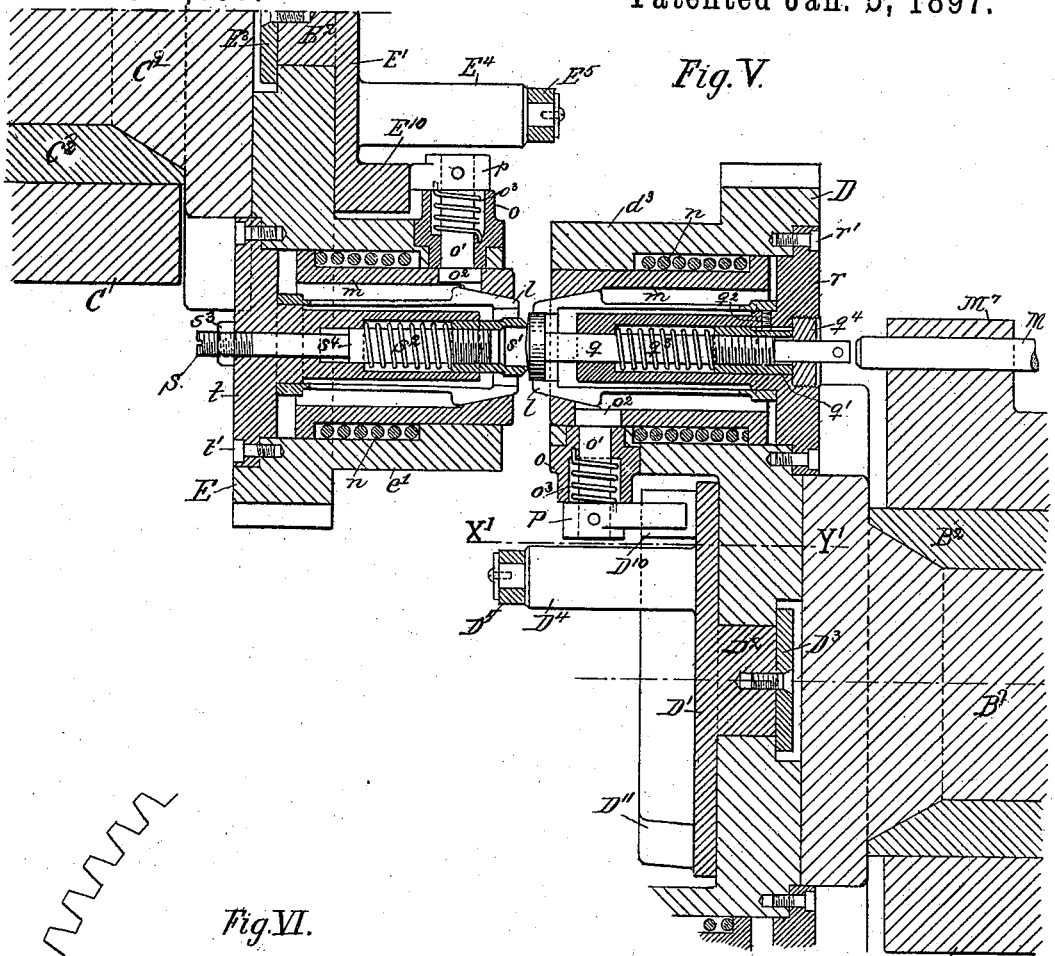
Fig. V.
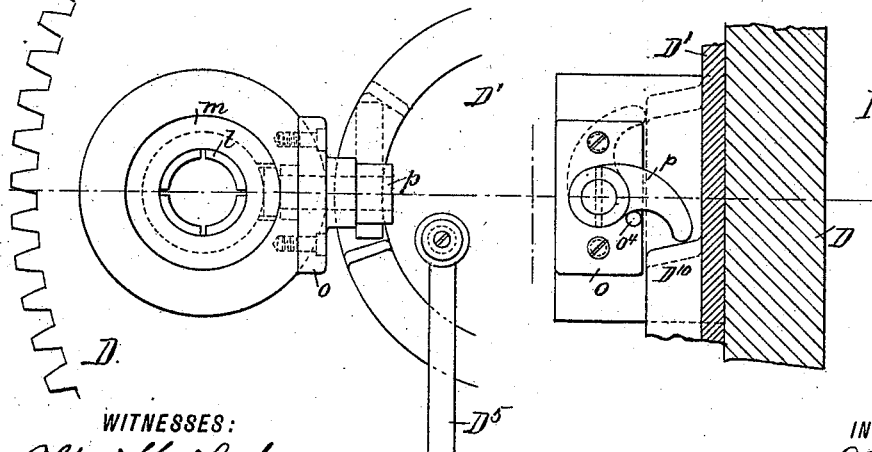
Fig. VI.
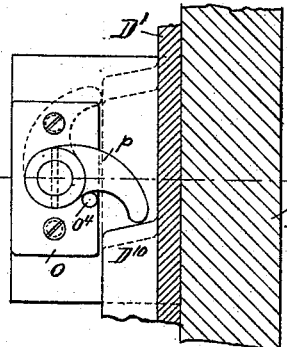
Fig. VII.
WITNESSES:
Alfred Shedlock
Catharine Georgi
INVENTOR
O. Tyberg

UNITED STATES PATENT OFFICE.

OLUF TYBERG, OF BROOKLYN, NEW YORK, ASSIGNOR, BY MESNE ASSIGNMENTS, TO TILLIE BÖHM, OF NEW YORK, N. Y.

BUTTON-MAKING MACHINE.

SPECIFICATION forming part of Letters Patent No. 574,857, dated January 5, 1897.

Application filed May 4, 1895. Serial No. 548,133. (No model.)

*To all whom it may concern:*

Be it known that I, OLUF TYBERG, a subject of the King of Denmark, at present residing at Brooklyn, in the county of Kings and State of New York, have invented certain new and useful Improvements in Button-Making Machines, of which the following is a specification.

The object of this invention is to construct a machine which will from different materials and from the rough blanks of the same finish different shapes of buttons and similar articles. To accomplish this, the blanks are inserted into a chuck placed on the face of a turret, which face is that in a plane at right angles to the axis of the turret, and the axis of the chuck is parallel with the axis of the turret. Said turret after the blanks have been inserted and locked in the chuck moves this chuck, with the blank, in front of a tool held in a revolving spindle, which finishes the one side of the button. Then the chuck is again moved into another position directly opposite another chuck placed on the face of another turret. The blank is here transferred from the first chuck to the second, sending the finished side of the blank into the chuck and exposing the unfinished side. This chuck is then in turn moved by its turret in front of a second tool, also held in a revolving spindle, where the other side of the button is finished. Next the chuck is moved in front of a drill-spindle, where two diagonally opposite holes are drilled, and from there in front of a second drill-spindle, where two additional holes (transversely diagonal to the first two) are drilled. As the chuck leaves the second drilling position the chuck opens and the button is pushed out. As each turret has a series of chucks, all these operations take place at the same time on consecutively-inserted blanks in the different chucks, and as for every movement of the turret all the chucks advance from one position to another, and as a blank is inserted between each movement so a button is finished as well.

All the motions are automatic save the inserting of the blank into the chuck.

Referring to the drawings, Figure 1 is a plan view of the machine with certain parts removed and others shown in section. Fig. 2 is a rear end view. Fig. 3 is a sectional view taken on line X Y of Fig. 1, looking to the left; Fig. 4, a left-hand side view; Fig. 5, a sectional view showing the construction of the chucks and the manner of transferring the buttons from one chuck to the other. Fig. 6 is a face view of one of the chucks; Fig. 7, a side view of the chucks through sections X' Y' of Fig. 5.

A is a base-plate, which has two upright projections B and C. These projections, with their caps B' and C', (cap B' is removed from Fig. 1,) form the bearings for the revolving turrets $B^2$ and $C^2$, mounted in bushes $B^3$ and $C^3$. In order to procure a perfect bearing and to be able to take up wear, the front portions of the turret-spindles are made conical, while on their rear ends are mounted conical sleeves $B^4$ and $C^4$, held in place by nut $B^5$ and star-wheel $C^5$, respectively. The bush $C^3$ is held firmly in its bearings, while bush $B^3$ has a longitudinal adjustment by means of its lug $b'$ and adjusting-screw $b^2$, and by means of which the turrets may be brought closer together or farther apart. To the turrets $B^2$ and $C^2$ are fastened, by means of screws, two geared plates D and E, each of which carries on its face four chuck-holders $d'$, $d^2$, $d^3$, and $d^4$ and $e'$, $e^2$, $e^3$, and $e^4$, to be referred to hereinafter.

The caps B' and C' extend upward and form the bearings $B^6$ and $C^6$ for a shaft 7, which carries pinions $B^8$ and $C^8$, which mesh into the geared plates D and E, respectively. As the geared plates D and E are of equal size and the pinions $B^8$ and $C^8$ are of equal size, it follows that the two turrets will move with equal velocity and each will complete a revolution or a quarter of a revolution in the same time. The turrets are revolved a quarter of a revolution at a time in the direction indicated by arrows, and after each motion of the turrets have been completed these are locked by a bolt $f$, mounted in the projection C, and which fits into either one of four holes $f'$ in the turret $C^2$.

The operation of revolving and locking the turrets is as follows: In the frame A is a cam-shaft G, mounted in bearings $g'$ $g^2$, and to which is fastened beyond the rear end of the frame a worm-wheel $g^3$, held in place by the nut $g^4$. Into the worm-wheel is meshed a worm $g^5$ on the shaft $g^6$, which runs in bearings $g^7$ and $g^8$, fastened to frame A, and driven by a cone-pulley $g^9$. The cam-shaft is revolved by the worm-wheel in the direction indicated by arrows on Fig. 2. The cam-shaft G carries a series of cams, $G'$, $G^2$, $G^3$, $G^4$, and $G^5$, each of which perform a particular function, which will be described in turn hereinafter.

In the frame A, on a shoulder-screw $f^2$, is mounted a lever F, which has one arm $f^4$, carrying a roller $f^6$, resting against the lower side of cam $G^2$, and another arm $f^5$, which by means of the connecting-rod $F'$ is connected to the gibbed slide $F^2$, sliding on the slide-block $F^3$. By the revolving of the cam $G^2$ the slide $F^2$ is moved up and down, the weight of the slide always keeping the roller $f^6$ against the face of the cam $G^2$. In the slide-block $F^3$ is pivoted at $f^9$ a lever, whose upper arm $F^4$ engages with the lock-bolt $f$ through a slot in the same, and against which lower arm $F^5$ a spring $f^{10}$ rests and tends to push the lock-bolt into the holes of the turret. On the slide $F^2$ is a pawl $f^{11}$, pivoted in the lugs $f^{12}$, and the weight of which keeps it normally resting against the lower side of the opening $f^{13}$ in the slide $F^2$. On the slide $F^2$ is also mounted on a stud $f^7$ a pawl-arm $F^6$, which lower projection $f^{19}$ is held normally against pin $f^{16}$ by the spring $f^{17}$. This pawl-arm $F^6$ has a pin $f^8$, which engages with the star-wheel $C^5$ in its upward movement and through it revolves the turrets one-quarter of a revolution. As the slide moves upward and before the pawl-arm $F^6$ engages the star wheel, the pawl $f^{11}$ engages the face $f^{20}$ of the lever-arm $F^5$, and by pushing against it forces, through the upper lever-arm $F^4$, the lock-bolt $f$ out of engagement with the turret. The pawl $f^{11}$ then slides along on the face until the pawl-arm $F^6$, through the star-wheel, has revolved the turret one-quarter of a revolution, when the pawl $f^{11}$ drops into the recess $f^{15}$ of the lever-arm $F^5$ and thus allows the lock-bolt to again enter one of the holes $f'$ in the turret. On the downstroke of the slide the pawl $f^{11}$ slides over the face $f^{14}$ till it again reaches its normal position. The revolving and locking mechanism, as described, applied to the turret $C^2$ on the left-hand side of the machine, operates and locks, through the connecting-gears already described, both the turrets. This mechanism may be duplicated and applied to turret $B^2$ as well, in which case the intermediate gears $B^8$ and $C^8$ may be dispensed with.

The axes of the two turrets $B^2$ and $C^2$, as shown by the drawings, are parallel and lie in the same horizontal plane. The chuck-holders are placed in circles on the geared plates D and E and are ninety degrees apart on a radius equal to half the perpendicular distance between the two axes of the turrets. The turrets are geared together in such a manner that two of the chuck-holders, one from each turret, will always be opposite each other whenever the turrets are locked, in order that the button or blank may be transferred from the one chuck to the other.

The construction of the chucks is as follows, (see Figs. 5, 6, and 7): The buttons are held by regular split collets $l$, made with spring-tension, the tendency of which is to open the collets. These collets have no longitudinal movement. Outside of these and supported in the chuck-holders $d'$ $d^2$ $d^3$ $d^4$ and $c'$ $c^2$ $c^3$ $c^4$ are the chuck-sleeves $m$, which fit upon the inclined surface of the collets $l$ and upon which act the springs $n$, continually tending through the sleeves to close the collets $l$. On the sides of the chuck-holders pointing toward the axes of the turrets are secured blocks $o$, carrying shafts $o'$, having at their one end eccentric-disks $o^2$, which fit into slots of the sleeves $m$. At the other end of the shaft $o$ is secured an arm $p$, which by the spring $o^3$ is held normally against pin $o^4$. By the turning of the arm $p$ the sleeves $m$ are moved in and out, thus closing and opening the collets $l$. All these parts are common to all the chucks upon both turrets.

The chucks on the geared plate D have plungers $q$, supported in plugs $r$, fastened by screws $r'$ to the rear face of the plate D. The plugs $r$ carry the collets $l$. On the threaded part of the plunger $q$ are nuts $q'$, which are free to move out and in with the plunger $q$ in the plugs $r$, but are prevented from turning around by the screws $q^2$. Against the nuts $q'$ act the springs $q^3$, normally keeping the plungers back against the nut $q^4$, screwed into the plug $r$. The plunger $q$ determines how far the blanks may be inserted into the chucks, and as this distance varies with the different thicknesses of buttons it must be made adjustable, and said adjustment is accomplished by the turning of the plunger $q$ in the nuts $q'$.

The chucks on the geared plate E have plungers $s$, supported in plugs $t$, fastened to the rear face of the plate E by means of the screws $t'$. These plugs also carry the collets $l$. To the threaded large end of the plunger $s$ are screwed caps $s'$, against which the springs $s^2$ act, always pushing the plunger outward as far as the adjustable nut $s^3$ at the other end of the plungers $s$ will permit. As the plungers $s$ are pushed into the chucks, as will be described later, they stop against the shoulders $s^4$, and the amount of button that will enter the chuck is determined by the distance from this shoulder $s^4$ to the front end of the caps $s'$, which distance is adjustable by screwing the caps $s'$ out and in on the plunger $s$.

On the face of the geared plates D and E are two cam-disks $D'$ and $E'$, guided by plugs $D^2$ and $E^2$, and held in position by the washers $D^3$ and $E^3$. On a portion of the circumference of these cam-disks $D'$ and $E'$ are placed the cams $D^{10}$ $D^{11}$ and $E^{10}$ $E^{11}$, which open and close the chucks by acting upon the arms $p$ in a manner to be described hereinafter. The cam-disks D' and E' have projections D⁴ and E⁴, to which are pivoted the one end of connecting-rods D⁵ and E⁵, the other ends of which are pivoted to the arms D⁶ and E⁶ of levers pivoted on rod M, held in lugs M' and M² on the frame A, Fig. 2. The other arms D⁷ and E⁷ of these levers carry rollers D⁸ and E⁸, which rest against the cams G³ and G⁴, respectively, on cam-shaft G. The rollers are held against the faces of the cams by springs D⁹ and E⁹. From this construction it follows that the cam-disks D' and E' do not revolve with the geared plate, but are controlled in their movements entirely by the cams G³ and G⁴. On rod M is also pivoted a third lever, which lower arm M³, carrying a roller M⁴, also rests against the cam G³, directly above the roller E⁸ on the lever-arm E⁷ and held against the cam by spring M⁹. Its upper arm M⁵ extends upwardly behind the geared plate D and abuts against a pin M⁶ in the lug $m^7$ of projection B. This pin is directly behind the chuck-holder $d^3$ and in line with the plunger $q$, on which it is made to act in a manner which will be hereinafter described.

Opposite and in line with the chuck-holders $d^2$ and $e^2$ on the geared plates D and E are two hollow revolving spindles B⁹ and C⁹, supported at their front ends by bearings B¹⁰ and C¹⁰ and at their rear ends by bearings B¹¹ and C¹¹. These bearings are supported on arms B¹² and B¹³ and C¹² and C¹³, extending from the caps B' and C'. The cutter-spindles B⁹ and C⁹, which are revolved by their respective pulleys B¹⁴ and C¹⁴, are hollow. (The spindle C⁹ is shown in section on Fig. 1.) The front portion of the spindle has rectangular holes B¹⁵ and C¹⁵, which thickness corresponds to the thickness of the tools $b$ and $c$, and thus guides them in one direction. The width of these holes is considerably wider than the width of the tools, in order that the tools may be canted or set at different angles, so as to present a different cutting face to the buttons. The adjustment of this angle is obtained by the adjusting-screws $b'$ $b^2$ $b^3$ and $c'$, $c^2$, and $c^3$.

The manner of feeding the cutting-spindles forward is as follows: Against cam G⁵ rests a roller U, supported in the lower end of an arm U', pivoted on the shoulder-stud U² in lug U³. This arm carries a lug U⁴, (see Fig. 3,) against which rests a screw U⁵, held in the arm V, and which is fastened to the lower end of the upright shaft V', supported in bearings V² and V³. The arm V is connected to a similar arm W on the other side of the machine by means of a connecting-rod U⁶, upon which acts the spring U⁷. The arm W is fastened to the lower end of the upright shaft W', supported in bearings W² and W³. To the upper ends of the shafts V' and W' are fastened two forked arms V⁴ and W⁴, which straddle the respective spindles B⁹ and C⁹ and grip the pins of collars V⁵ and W⁵, loosely mounted on the spindles and held in place there by the nuts V⁶ and W⁶. Thus by the revolving of the cam G⁵ the spindles are fed forward and again returned by the action of the spring U⁷.

The manner of drilling the holes in the buttons is as follows: Opposite the chuck-holders $e^3$ and $e^4$ of the geared plate E are two hollow drill-spindles I and J, driven by pulleys I' and J'. Pulley I' is a double-grooved pulley. By a belt around one of these grooves the spindle I is driven from the counter-shaft, and a belt around the other groove in the pulley I' to the grooved pulley J' drives the other spindle J. The spindles have chucks I² and J² for the holding of the drills $i$ and $j$, which are inserted from behind through the spindles. The front ends of the spindles are supported in bearings I³ and J³ and the rear ends in bearings I⁴ and J⁴. Collars I⁵ and J⁵ take the thrust of the spindles. The spindle-bearings are supported by arms, the lower portions of which form the V-slide K, which is free to slide in the direction parallel with the axis of the drill-spindles in the slide-block K'. The slide-block K' again slides on a V-block K², bolted to the top of the frame A, and is free to slide in a right-angular direction to that of the V-slide K. In the V-block K² is pivoted on pin K³, held in bearings N' and N², a lever, the upper arm K⁴ of which straddles a pin K⁵, held in lugs K⁶ of the V-slide K, and the lower arm K⁷ of which carries a roller K⁸, which rests against the outer face of the cam G', and which thus feeds the drill-spindles forward. A spring K⁹ returns the drill-spindles. On the side of the V-block K² is a lever pivoted at L, and the upper arm L' of which pushes against an adjustable screw L³, held in lug L⁴ in the V-slide K, while the lower arm L⁵ carries a roller L⁶, which rests against the side of the cam G' and is held against the cam by means of the spring and plunger L⁸ in the lug L⁷. A weight H is, by a chain H', fastened to the slide-block K'. The chain runs over a pulley H², supported on arm H³, which is connected to the V-block K². On a lug H⁴ on the V-block K² is an adjustable screw H⁵, which limits the motion of the arm L'. Thus by the two adjusting-screws L³ and H⁵ the side motion to the drill-spindles may be controlled, and the distance between the holes in the button adjusted.

The general operation of the machine is as follows: A blank is inserted into the chuck $d'$ on the geared plate D at the front of the machine. This chuck has been opened by the action of the cam D¹⁰ D¹¹ of the cam-disk D' acting upon the arm $p$ of the chuck $d'$. As soon as the turret begins to revolve the arm $p$ leaves the cam D¹⁰ D¹¹ and swings down into its normal position, thus closing the chuck and gripping the blank firmly. The chuck $d'$ is then moved into the position just occupied by chuck $d^2$, where its face is turned by the tool $c$ in the hollow revolving spindle $c^9$. When this operation is completed, the chuck is brought into position indicated by $d^3$. In so doing the finished side of the button passes in front of the chuck occupying position $e'$ on the geared plate E and rests against cap $s'$ on the plunger $s$. These plungers have been adjusted by the nuts $s^3$ so that they will just reach the button in the opposite chuck and push against the button before the chuck $d^3$ opens. The chuck $e'$ has been opened before it gets into position in a manner which will be described later. The chuck $d^3$ is then opened by the upward movement of the rod $D^5$, which turns the cam-disk $D'$ and through cam $D^{10}$ swings the arm $p$, thereby opening the chuck. The cam $G^3$ now allows the lever-arm $M^3$, by means of its spring $M^9$, which is considerably stronger than the spring $s^2$ on the plunger $s$, through the pin $M^6$ and the plunger $q$, to push the button into the chuck $e'$. By a downward motion to the rod $E^5$ the cam $E^{10}$ on the cam-disk $E'$ moves out of contact with the arm $p$ of the chuck $E'$, which by its spring $o^3$ swings into its normal position, thus closing the chuck on the inserted button. The plunger $q$ of chuck $d^3$ then returns into its normal position. The chuck $d^3$ passes then through position $d^4$ back to position $d'$, remaining open all this time and ready to receive a new blank and ready to repeat the operation just described. The chuck $e'$ moves into position $e^2$, while chuck $d^3$ moves into position $d^4$, when the other side of the button is faced by tool $b$ in the revolving spindle $B^9$. From there it moves into position $e^3$, where it is placed opposite the drill-spindle I. This drill-spindle is now fed forward by the cam $G'$ acting on the roller $K^8$ on lever-arm $K^7$, and drills first one of the holes in the button. The spindle is then returned and immediately afterward moved sidewise by the lever $L'$ $L^5$, actuated by the side of the cam $G'$, and the drill-spindle is again fed forward, drilling the second hole diametrically opposite the first one on a horizontal line. The chuck is now moved into position $e^4$, in which position the two holes drilled in the position $e^3$ occupy a vertical relation to each other. Here the drilling operation is repeated exactly as in position $e^3$ by the drill-spindle J and the two additional holes completing the square drilled. As soon as the chuck leaves the position $e^4$ to return to the position $e'$ the chuck is opened by the arm $p$ striking the cam $E^{11}$ on the cam-disk $E'$, and the button is pushed out by the spring $s^2$ acting on the plunger-cap $s'$. The arm $p$, after having opened the chuck, slides along on the face of the cam $E^{10}$ $E^{11}$, keeping the chuck open as it gets into position $e'$, where it is then ready to receive a new blank. All of the chucks follow the same sequence of operation as those already described. Each of the chucks on the plate D is supplied with a blank when occupying position $d'$, and a button completed and discharged at each quarter of a turn of the turrets.

The number of chucks on each plate may be increased or diminished as circumstances might require; nor is it necessary that each plate should contain the same number of chucks, provided the two geared plates are geared in the proper proportion to one another.

I claim as my invention—

1. In a mechanical organization for forming complete buttons from rough blanks, the combination of a series of chucks each adapted to hold an individual button-blank, inserted from the front, and having an internal seat against which the inner face of the blank bears, a rotating tool adapted to act on the exposed face of the blank, another series of chucks, means for transferring the partly-formed blank from a chuck of the first series into a chuck of the second series, thus exposing the other face thereof, a rotating tool for forming this face of the button, and a drilling device for perforating the blank while held in the chuck of the second series.

2. In a machine for making buttons, the combination of two turret-heads each provided with a series of chucks, having axes parallel to the axis of the turrets, adapted to hold button-blanks inserted from the front and having internal seats against which the inner faces of the blanks bear, said turret-heads being movable and so arranged that a chuck of one of the turret-heads may be brought to face a chuck of the other turret-head, and in alinement therewith, and means for transferring a blank from a chuck of one of the turret-heads to a chuck of the other turret-head.

3. In a machine for making buttons, the combination of two turret-heads each provided with a series of chucks, having axes parallel to the axis of the turrets, adapted to hold button-blanks inserted from the front and having internal seats against which the inner faces of the blanks bear, said turret-heads being movable and so arranged that a chuck of one of the turret-heads may be brought to face a chuck of the other turret-head, and in alinement therewith, means for transferring a blank from a chuck of one of the turret-heads to a chuck of the other turret-head, and a revolving tool-holder and tool carried thereby arranged in front of and in alinement with a chuck of each of the turrets, when the turrets are at rest, whereby the two sides or faces of the blanks may be acted upon and formed.

4. In a machine for making buttons, the combination of two turret-heads each provided with a series of chucks, having axes parallel to the axis of the turrets, adapted to hold button-blanks inserted from the front and having internal seats against which the inner faces of the blanks bear, said turret-heads being movable and so arranged that a chuck of one of the turret-heads may be brought to face a chuck of the other turret-head, and in alinement therewith, means for transferring a blank from a chuck of one of the turret-heads to a chuck of the other turret-head, a revolving tool-holder and tool carried thereby arranged in front of and in alinement with a chuck of each of the turrets, when the turrets are at rest, whereby the two sides or faces of the blanks may be acted upon and formed, and means for rotating the turret-heads to bring the chucks carried thereby successively in opposition.

5. In a machine for making buttons, the combination of a turret-head having a series of chucks circularly arranged, on the face and having axes parallel with the axis of the turret, another turret-head having a series of chucks similarly arranged facing in the opposite direction to the first turret-head and located so that the chucks of the two turret-heads may be brought successively in alinement, gear-teeth on the peripheries of the two turret-heads, a shaft and pinions connecting the turret-heads by their gear-teeth, and means applied to one of the turret-heads for intermittently rotating the turret-heads and setting them with their chucks successively in opposition.

6. In a machine for making buttons, the combination of a turret-head provided with a series of button-blank-holding chucks, means for intermittently rotating the turret-head, a drilling-spindle and drill carried thereby, and means for automatically shifting the drilling-spindle whereby the drill may be brought into two positions, to drill two holes in each button-blank, as the blanks are successively presented to the drill, and while the blank occupies the same position.

7. In a machine for making buttons, the combination of a turret-head provided with a series of button-blank-holding chucks, means for intermittently rotating the turret-head, a drilling-spindle and drill carried thereby, means for automatically shifting the drilling-spindle whereby the drill may be brought into two positions to drill two holes in each button-blank, as the blanks are successively presented to the drill, and while the blank occupies the same position, and another drilling-spindle and drill carried thereby, and arranged to similarly drill two additional holes in the blanks when the blank is in another position from the position it occupied when acted upon by the first drill.

8. In a machine for making buttons, the combination of a turret-head having a series of chucks circularly arranged, another turret-head having a series of chucks circularly arranged facing the opposite direction to the first turret-head, and located so that the chucks of the two turret-heads may be brought successively in alinement, means for intermittently rotating the turret-heads, a revolving tool-holder and tool carried thereby arranged in front of and in alinement with a chuck of each of the turrets, whereby the two sides or faces of the blanks are acted upon and formed, two drilling-spindles and drills carried by a carriage or slide and arranged to act on the blanks held in the chucks of one of the turret-heads which are in different positions to one another, and means for shifting the drill carriage or slide.

9. In a machine for making buttons, a series of chucks similarly constructed carried by a turret-head and each composed of spring-acting collets or gripping-jaws, a spring-acting sleeve adapted to close the jaws, and a spring-acting discharge-plunger centrally arranged between the jaws, in combination with means for allowing the jaws to open when the chucks are in one position to receive the blank, and also to open the jaws when the chucks acquire another position, a device for pressing forward the plungers to discharge the blanks from the chucks when in this position, another series of chucks carried by another turret-head arranged and operated so that the chucks are successively in alinement with the chucks of the first turrets as they assume their discharging positions to receive the blanks discharged from the first series of chucks.

10. In a machine for making buttons, the combination of two turret-heads, each provided with a series of chucks, having axes parallel to the axis of the turrets, adapted to hold button-blanks inserted from the front and having internal seats against which the inner faces of the blanks bear, said turret-heads being movable and so arranged that a chuck of one of the turret-heads may be brought to face a chuck of the other turret-head, and in alinement therewith, means for automatically opening and closing the two chucks when they are in line with each other, and means for transferring a button-blank from a chuck of one of the turret-heads to a chuck of the other turret-head.

11. In a machine for making buttons, the combination of two turret-heads, each provided with a series of chucks, having axes parallel to the axis of the turrets, adapted to hold button-blanks inserted from the front and having internal seats against which the inner faces of the blanks bear, said turret-heads being movable and so arranged that a chuck of one of the turret-heads may be brought to face a chuck of the other turret-head, and in alinement therewith, a cam or cam-plate mounted upon the frame of the machine and at right angles to the chucks, and adapted to open and close the chucks, mechanism for actuating said cam-plate, and means for transferring a blank from the chuck of one turret-head to a chuck of the other turret-head, substantially as set forth.

12. In a button-making machine, the combination of two turret-heads, each having a series of chucks, the chucks of one turret-head containing spring-retracted plungers, and means for pressing said plungers forward, the chucks of the other turret-head each containing a normally-projected plunger, said latter plunger being adapted to be depressed by said first-named plunger when the button-blank is between the two plungers and is being transferred from one chuck to another, substantially as set forth.

13. The transfer mechanism, consisting of the combination of a chuck containing a plunger, a retracting-spring in said chuck for the plunger, and means for pushing the plunger forward, with a chuck for the other plunger wherein the latter is held normally projected, the same being adapted to be depressed by the first-mentioned plunger when the backed button-blank is between them, substantially as set forth.

14. In a machine for making buttons, the combination with a turret-head provided with a series of chucks, and another turret-head also provided with a series of chucks presented toward the other series of chucks, of revolving tool-holders and their tools, which are presented in opposite directions and arranged at right angles to the planes of the turret-heads, and means for simultaneously reciprocating the revolving tool-holders and tools, consisting of a cam-shaft provided with a cam, a lever actuated by said cam, vertical oscillating shafts at opposite sides of the machine, each provided with an arm at one end and connected with the shafts or spindles of the respective tools, an arm at the other end of each of the shafts, and a connecting-rod between the last-named arms, substantially as set forth.

15. In a machine for making buttons, the combination with a turret-head provided with a series of chucks on one face, another turret-head provided with a series of chucks on one face presented toward the other series of chucks, all the said chucks having axes parallel to the axis of the turrets, means for connecting the turret-heads for simultaneous rotation, and the revolving tool-holders and their tools, of means for transferring the button-blank from one alined chuck to another, a cam-shaft, a lever actuated by a cam on said shaft, a slide guided on the frame of the machine and connected with said lever, a star-wheel mounted on the shaft of one of the turret-heads, and a pivoted actuating-arm carried by said slide and adapted to engage and intermittently rotate said star-wheel and through the same rotate the turret-heads, substantially as set forth.

16. In a machine for making buttons, the combination with a turret-head provided with a series of chucks on one face, another turret-head also provided with a series of chucks on one face presented toward the other series of chucks, means for connecting the turret-heads for simultaneous rotation, and the revolving tool-holders and tools for the respective turret-heads, of a slide guided on the frame of the machine, means for reciprocating said slide, means for intermittently rotating one of the turret-heads through the medium of said slide, a locking-bolt guided in the frame of the machine and adapted to engage in holes in the last-named turret-head, a fulcrumed lever acting on said locking-bolt and arranged in a recess in the block on which the slide is guided, said lever being provided with a recess, and a pawl on said slide adapted to engage in the recess of said lever, substantially as set forth.

17. In a machine for making buttons, the combination with a turret-head provided with a series of chucks, another turret-head also provided with a series of chucks arranged parallel with the other series of chucks, the revolving tool-holders and tools for the respective turret-heads, arranged parallel with the axes of and extending toward the respective heads and located near the peripheral parts of the heads, and means for holding one of the chucks of one of the turret-heads in alinement with one of the chucks of the other turret-head, at the adjacent peripheral parts of the heads, of a transfer-pin guided in the frame of the machine parallel with the rotating tools and adapted to transfer a backed button-blank from one alined chuck to the other, and means for reciprocating said transfer-pin, substantially as set forth.

In testimony whereof I have hereunto subscribed my name.

OLUF TYBERG.

Witnesses:
JOHN B. MCCARTHY,
CATHARINE GEORGI.